United States Patent Office 3,756,915
Patented Sept. 4, 1973

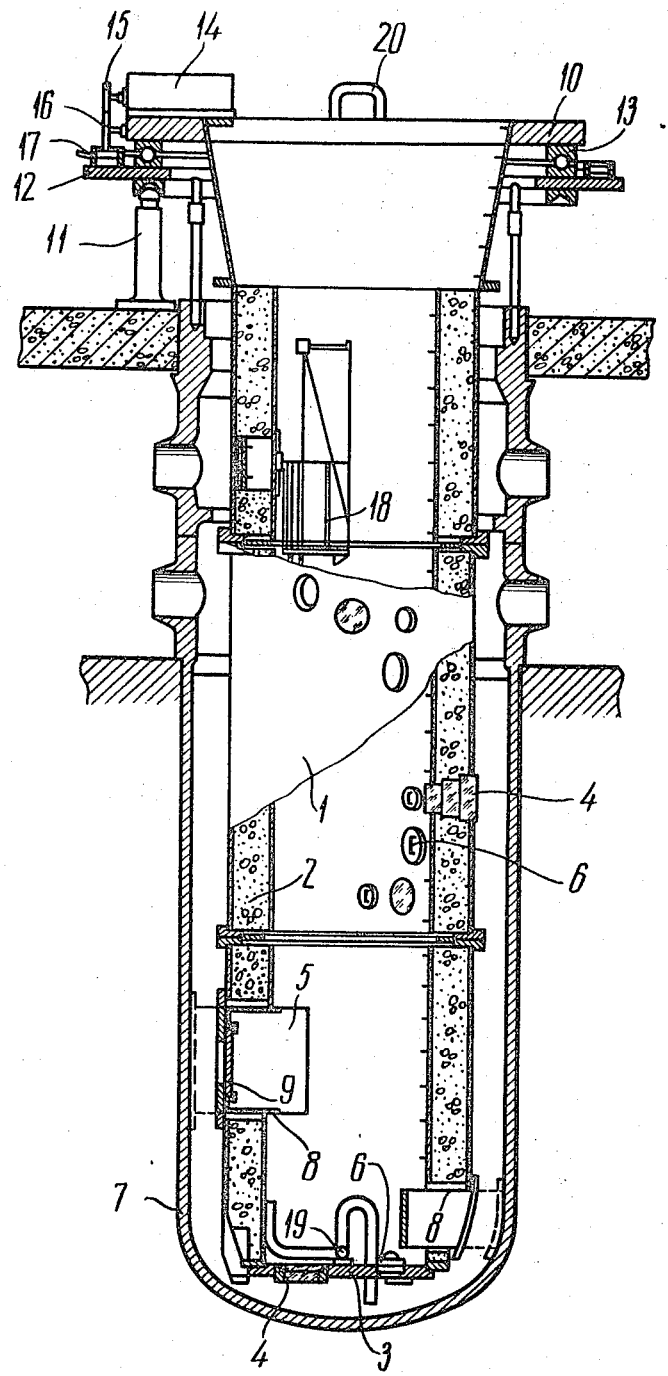

3,756,915
DEVICE FOR DETECTING FLAWS ON NUCLEAR REACTOR INNER SURFACES AND INTERNALS
Anatoly Matveevich Bukrinsky, ulitsa Krylenko 9, kv. 6; and Jury Kupriyanovich Gladkov, 4 Vyatsky pereulok 22b, kv. 41, both of Moscow, U.S.S.R.; Vladimir Abramovich Kazakov, ulitsa Mirnaya 30, kv. 32, Lobnaya Moskovskoi Oblasti, U.S.S.R.; and Leonid Pavlovich Maximov, Anadyrsky proezd 63, kv. 205; Viktor Nikolaevich Mironov, 1 ulitsa Mashinostroenia 2/7, korpus 2, kv. 58; Vladimir Alexandrovich Khmelnitsky, ulitsa Usacheva 29, korpus 7, kv. 410; and Nikolai Nikolaevich Habanov, Ozerkovskaya naberezhnaya 48/50, kv. 137, all of Moscow, U.S.S.R.
Filed Jan. 24, 1972, Ser. No. 220,339
Claims priority, application U.S.S.R., Jan. 25, 1971, 1612258
Int. Cl. G21c 17/08
U.S. Cl. 176—19                                   1 Claim

ABSTRACT OF THE DISCLOSURE

A device for detecting flaws on nuclear reactor inner surfaces and internals, wherein an inspection chamber with at least one inspection window moves about inside the reactor with the help of a means for positioning the inspection chamber. The chamber is connected with said means via a support element mounted above the reactor such that the chamber can rotate about and move along the vertical axis of the reactor.

---

The present invention relates to devices for inspecting and repairing nuclear reactor inner surfaces and, more particularly, to devices for detecting flaws on nuclear reactor inner surfaces and internals.

Known in the art is a device for detecting flaws on nuclear reactor inner surfaces and internals, in which a portable viewing chamber constructed from a shielding material and comprising at least one inspection window, is moved along a vertical axis inside the reactor vessel by means of a device for positioning the viewing chamber.

In said device the viewing chamber is constructed from a length of corrugated culvert pipe shielding the inspector from radiation. The inspector examines the inner surface of the nuclear reactor through a window in the pipe.

The viewing chamber is positioned inside the vessel of a shut down reactor by the reactor service crane, with the chamber suspended on a rope therefrom. With this arrangement the flexible coupling between the chamber and the crane is not reliable and detracts from the efficiency of inspection of the reactor inner surfaces.

Nor does said device provide for comprehensive observation of the reactor metal as affording limited access to the inner surface, important sections, such as the reactor bottom, being beyond the reach of the device.

Employment of the reactor service crane for positioning the inspection chamber creates difficulties, for the crane is engaged during the entire inspection time which is likely to disrupt repair schedules of other equipment.

The horizontal position of the chamber is inconvenient for the inspector. Furthermore, employment of the reactor service crane as a means for positioning the inspection chamber is a hazard for the inspector on account of possible rope ruptures or crane handler's blunders.

It is an object of the present invention to provide a device for detecting flaws on nuclear reactor inner surfaces and internals, providing access to the entire inner surface of a nuclear reactor with a maximum of safety.

It is herein contemplated that there shall be provided a device for detecting flaws on nuclear reactor inner surfaces and internals, wherein an inspection chamber constructed from a shielding material and having at least one inspection window is moved along a vertical axis interiorly of the reactor by a means for positioning the inspection chamber, wherein in accordance with the invention, the inspection chamber is connected, via a support element mounted above the reactor, with the means for positioning the chamber in such a way as to provide for the rotation thereof about the vertical axis of the reactor.

The herein disclosed invention is a considerable improvement on the known device in that it affords an expanded scope of operations thereby substantially reducing the time required for the inspection and repairing of the reactor vessel and internals; it also provides reliable shielding against radiation and eliminates the risk element for the inspector.

The invention will be better understood from the following description of an embodiment of the invention taken in conjunction with the accompanying drawing which is a partial longitudinal section of the herein disclosed device for detecting flaws on nuclear reactor inner surfaces and internals.

The present device for detecting flaws on nuclear reactor inner surfaces and internals comprises an inspection chamber 1 formed as a three-section cylindrically-shaped vertically mounted chamber provided with a biological radiation shield 2 constructed from concrete. The sectional arrangement of the chamber 1 makes it feasible to transport oversize heavy loads and permits sectionwise assembly on-site in the reactor hall.

About the cylidrical surface of the chamber 1 and a bottom 3 thereof there are provided as many inspection windows 4, through channels 5 for tools and equipment required for repair work and hatches 6 provided with removable biological shielding in the form of metal disks, as are needed for examining and repairing the entire inner surface of a reactor vessel 7.

Some of the through channels 5 are fitted with extension bushings 8 actuated by mechanical jacks (not shown) and having sliding curtains 9 which facilitate repairs on the reactor vessel 7 and minimize time consumption.

The through channels 5 are adpated to accommodate specially-designed repair equipment remotely controlled from the chamber 1.

The design features of the flange closures of the inspection chamber 1, through channels 5, inspection windows 4 and hatches 6 prevent radiation from the side surface of the vessel 7 from directly bearing on the chamber 1, and also reduce the radiation level in the chamber 1 to an extent affording a lengthy stay time for the inspector.

The inspection chamber 1 is rigidly connected, by means of a support element mounted above the reactor and formed in the given embodiment of the invention by a support plate 10, with means for positioning the chamber 1 such that the chamber 1 can rotate about and move along the vertical axis of the reactor. Said means is defined by three hydraulic jacks 11 and an electric drive.

In the discussed embodiment of the invention the hydraulic jacks 11 are mounted on the floor of the reactor compartment and carry a ring 12. The ring 12 carries a journal bearing 13, the support plate 10 with the chamber 1 welded thereto mounted thereon, the chamber 1 shielding the reactor hall against radiation directed vertically upwards from the reactor.

The angular motion of the chamber 1 relative to the longitudinal axis of the reactor vessel 7 is provided by the journal bearing 13 and the electric drive comprising an electric motor 14 mounted on the support plate 10, a driving gear 15 mounted on the shaft of the electric motor 14 and, via an idle gear 16 fitted on the support plate 10, coupled with a driven gear 17 mounted on the ring 12.

The vertical motion of the chamber 1 relative to the inner surface of the reactor vessel 7 is provided by the jacks 11.

The inspection windows 4 are arranged in a helical line with a vertical pitch determined by the choice of the optimum vertical motion of the jacks 11, which amounts to 1200 mm. in the embodiment described. The initial position of the jacks 11 must provide a 600-mm. ascent and descent for examining the entire inner surface of the reactor vessel 7.

The inspection chamber 1 is fitted with sockets for mounting and fixing service turntables 18, as well as with a water-jet pump 19 for draining water from the reactor through a hatch 6 in the bottom 3 of the chamber 1 as the chamber is being lowered into the reactor.

The device of this invention is positioned in the reactor vessel 7 and raised therefrom by a crane (not shown) using lugs 20 welded onto the support plate 10.

In order to examine the reactor inner surface the chamber 1 is positioned in the reactor vessel 7 by the reactor service crane, the chamber 1 with the support plate 10 thereof resting, via the journal bearing 13 and the ring 12, on the jacks 11. As the chamber 1 is being lowered, the water in the reactor vessel 7 which serves as a biological shield against radiation from the inner surface of the vessel 7, is drained by the pump 19.

Inside the chamber 1 a turntable 18 is fixed at a required elevation, wherefrom the inspector examines and repairs the reactor vessel 7.

The vessel 7 is examined through the inspection windows 4, and repaired through the channels 5 and hatches 6, with the bushings 8 of the channels 5 extended until abutted against the vessel 7. The repair equipment is mounted in the bushings 8. To give direct access to the inner surface of the vessel 7, the curtains 9 of the extended bushings 8 are opened.

The chamber 1 is moved in a vertical direction over a predetermined distance by the hydraulic jacks 11. The chamber 1 is rotated about the reactor vertical axis in the following manner. When the electric motor 14 is energized, the idle gear 16 mounted on the support plate 10 turns the driven gear 17 fixed on the ring 12.

The chamber 1 is lifted out of the reactor vessel 7 by a crane after metal disks have been fitted into the hatches 6 and the bushings 8 into the channels 5.

In order to inspect reactor internals, the inspection chamber 1 is made up of two sections—upper and lower —which arrangement permits performing inspections in an unloaded reactor.

Application of the herein disclosed device gives a substantial economy of time on the inspection and, if required, repairing of the reactor internals and the entire inner surface of the vessel of a reactor which has previously been in operation. The reduction of time consumption is achieved by examining the inner surface in several spots at once from several turntables by several inspectors simultaneously. The reliable biological shielding affords a lengthy stay time for the inspector without any risk of excessive exposure.

The special design of the device of this invention allows the reactor service crane to be relieved for other operations.

The device installed on the reactor provides efficient shielding of the reactor premises against radiation emitted from within the dry reactor.

The considerable inner space of the chamber allows the inspector to manipulate a variety of tools and devices.

The sectional design of the inspection chamber makes it possible to conveniently transport sections to the reactor premises from the site of manufacture.

What is claimed is:

1. A device for detecting flaws on nuclear reactor inner surfaces and internals, comprising: an inspection chamber constructed from a material shielding the inspector against radiation; at least one inspection window of said chamber; a means for positioning said inspection chamber in said nuclear reactor; a support element mounted above said nuclear reactor whereby said inspection chamber is connected with said means for positioning said inspection chamber such that said chamber can rotate about the vertical axis of said reactor and move along said axis.

References Cited
UNITED STATES PATENTS

| | | | |
|---|---|---|---|
| 2,685,038 | 7/1954 | Hoss | 250—106 R |
| 2,983,659 | 5/1961 | Treshow | 176—27 |
| 3,042,803 | 7/1962 | Martelly | 250—106 R |
| 3,127,319 | 3/1964 | Matland | 176—87 |

FOREIGN PATENTS

| | | | |
|---|---|---|---|
| 921,905 | 3/1963 | Great Britain | 250—106 |

REUBEN EPSTEIN, Primary Examiner

U.S. Cl. X.R.
176—87; 250—106

UNITED STATES PATENT OFFICE
CERTIFICATE OF CORRECTION

Patent No. 3,756,915　　　　　　　Dated September 4, 1973

Inventor(s) Anatoly Matveevich Bukrinsky et al.

It is certified that error appears in the above-identified patent and that said Letters Patent are hereby corrected as shown below:

In the heading to the sheet of drawing line 1,

"A. MATVEEVICH ET AL" should read -- A. M. BUKRINSKY ET AL --.

In the heading to the printed specification, lines 12 and 13,

"Nikolai Nikolaevich Habanov" should read -- Nikolai Nikolaevich Shabanov --.

Signed and sealed this 11th day of February 1975.

(SEAL)
Attest:

RUTH C. MASON
Attesting Officer

C. MARSHALL DANN
Commissioner of Patents
and Trademarks